United States Patent
Berg et al.

(10) Patent No.: US 8,542,950 B2
(45) Date of Patent: Sep. 24, 2013

(54) FINDING ICONIC IMAGES

(75) Inventors: Tamara L. Berg, Madison, WI (US); Alexander Berg, Madison, WI (US)

(73) Assignee: Yahoo! Inc., Sunnyvale, CA (US)

( * ) Notice: Subject to any disclaimer, the term of this patent is extended or adjusted under 35 U.S.C. 154(b) by 514 days.

(21) Appl. No.: 12/476,711

(22) Filed: Jun. 2, 2009

(65) Prior Publication Data

US 2010/0303342 A1    Dec. 2, 2010

(51) Int. Cl.
*G06K 9/60* (2006.01)
*G06K 9/68* (2006.01)
*G06K 9/62* (2006.01)

(52) U.S. Cl.
USPC .......................... 382/305; 382/220; 382/225

(58) Field of Classification Search
None
See application file for complete search history.

(56) References Cited

U.S. PATENT DOCUMENTS

| | | | | |
|---|---|---|---|---|
| 5,566,246 | A * | 10/1996 | Rao | 382/154 |
| 7,660,468 | B2 * | 2/2010 | Gokturk et al. | 382/224 |
| 8,031,914 | B2 * | 10/2011 | Zhang | 382/118 |
| 2004/0197010 | A1 * | 10/2004 | Lee et al. | 382/103 |
| 2005/0165763 | A1 * | 7/2005 | Li et al. | 707/3 |
| 2006/0062451 | A1 * | 3/2006 | Li et al. | 382/159 |
| 2007/0127824 | A1 * | 6/2007 | Luo et al. | 382/224 |
| 2010/0299328 | A1 * | 11/2010 | Pachet | 707/736 |

OTHER PUBLICATIONS

Chen, Clue: Cluster-Based Retrieval of Images by Unsupervised Learning, 2008, IEEE Transactions on Image Processing, vol. 14, No. 8, pp. 1187-1201.*
Liu, Learning to Detect a Salient Object, 2007, IEEE Conference on Computer Vision and Pattern Recognition (CVPR). (8 pages).*
Varma, A Statistical Approach to Texture Classication from Single Images, 2004, Kluwer Academic Publishers, pp. 1-34.*
Wnuk, Filtering Internet Image Search Results Towards Keyword Based Category Recognition, 2008, IEEE Conference on Computer Vision and Pattern Recognition (CVPR), pp. 1-8.*
Definition of Separate, Collins English Dictionary—Complete & Unabridged 10th Edition [online], [Retrieved on Sep. 5, 2012]. Retrieved from the Internet: <URL: http://dictionary.reference.com/browse/separate>, p. 1.*

* cited by examiner

*Primary Examiner* — Bhavesh Mehta
*Assistant Examiner* — David F Dunphy
(74) *Attorney, Agent, or Firm* — James J. DeCarlo; Greenberg Traurig, LLP

(57) ABSTRACT

Iconic images for a given object or object category may be identified in a set of candidate images by using a learned probabilistic composition model to divide each candidate image into a most probable rectangular object region and a background region, ranking the candidate images according to the maximal composition score of each image, removing non-discriminative images from the candidate images, clustering highest-ranked candidate images to form clusters, wherein each cluster includes images having similar object regions according to a feature match score, selecting a representative image from each cluster as an iconic image of the object category, and causing display of the iconic image. The composition model may be a Naïve Bayes model that computes composition scores based on appearance cues such as hue, saturation, focus, and texture. Iconic images depict an object or category as a relatively large object centered on a clean or uncluttered contrasting background.

42 Claims, 8 Drawing Sheets

FINDING ICONIC IMAGES

BACKGROUND

1. Field

The present application relates generally to image processing and more particularly to machine-learning-based techniques for image search.

2. Related Art

Searching for images by keyword is known in the art. Internet search engines such as Yahoo®, Google®, and others provide image search features for finding graphical images on Internet web servers. In most existing image search engines, the search query is specified as text, which includes one or more keywords, and the search engine identifies images that are related to the keywords.

Most existing search engines do not analyze actual image data when determining if an image is related to the search keywords, but instead compare the search keywords to metadata keywords, such as tags, previously associated with the image by some other actor such as a human or a camera. A tag, also known as a "label", may be any word or phrase. Tags are ordinarily considered accurate if they have meanings related to the content of the image as perceived by a human. Conversely, tags that have very little or no relation to the image's content are considered inaccurate. A tag may be the name of a particular object in the image, e.g., "Eiffel Tower", or may be the name of a category of objects related to an object in the image, e.g., "Landmarks". Other metadata associated with images may be automatically generated, e.g., by a camera when a picture is taken. A camera may, for example, tag a picture with the time and date at which the picture was taken.

Relying on metadata keywords for image search has a number of limitations. There is no guarantee that any metadata tags are present on an image, or that the tags are accurate, and no way to determine the accuracy level of tags that are present. Even if the tags are accurate, they may be incomplete, e.g., describing the image at a very broad or narrow level, or describing some features of the image but not others. In experiments, more than half of the images with a category tag are found not representative of the object category specified by the tag, either because they do not depict the category or because the depiction is extremely abstract. Even for those images that do show the object category, many are poor examples of the category. In a large collection of images, there are often some quite good representative images of categories or objects. The problem is identifying the images that are good representatives among the "noise" of poor representative images. Category labels are often ambiguous. "Beetle" may refer to a car or an insect, for example. Previous work has proposed clustering (especially on text) as a tool for identifying multiple meanings and separating search results into groups according to different meanings. Clustering may be applied to a set of images to partition the set into subsets that correspond to image features, where each subset includes images that have similar features. However, applying clustering to image appearance directly is often not feasible. The millions of images returned by a search for a particular tag overwhelm many clustering approaches, because feature computation and comparison is more expensive for images than for text. In addition, even when clustering is computationally feasible, because of noise in the labeling, many clusters are meaningless or contain incorrect results.

Many images available online, e.g., on the Flickr® photo sharing site, or on other sites, are not reliably labeled with the name of the object represented in the iconic image. The images may be incorrectly tagged, or may not be true iconic images. For example, the images may be partial views of an object or views of the object surrounded by other objects. As states above, although existing text-based search engines provide image search features, most such search engines do not actually search the content of images, but instead search text data associated with images, such as metadata and web page text. For example, an image search for the term "boat" may return an image that is labeled with the text "boat", but the image search does not analyze the graphical features of the image itself to determine if the image depicts a boat. Searching for images of a particular object using existing image search engines may yield images that are poor representations of or are unrelated to the search query. It would be desirable, therefore, for image searches to find images that accurately depict the object named in a search query.

SUMMARY

In general, in a first aspect, the invention features a computer implemented method of finding iconic images for a given object category. The method includes receiving candidate images, using a learned probabilistic composition model to divide each candidate image into a most probable rectangular object region and a background region, wherein the most probable rectangular object region has a maximal composition score from possible composition scores computed according to the composition model for possible divisions of the candidate image into object and background regions, each possible composition score is based upon at least one image feature cue computed over the object and background regions, and the composition model is trained on a set of images independent of the candidate images, ranking the candidate images according to the maximal composition score of each image, removing non-discriminative images from the candidate images, clustering highest-ranked images from the candidate images to form clusters, wherein each cluster includes images having similar object regions according to a feature match score, selecting a representative image from each cluster as an iconic image of the object category, and causing display of the iconic image.

Embodiments of the invention may include one or more of the following features. The computer implemented method may include removing non-discriminative images from the candidate images, comparing each candidate image to highest-ranked candidate images using a similarity measure based upon the feature match score, wherein the feature match score is spatially restricted to the object regions, and removing each candidate image for which more than a predetermined percentage of images most similar to the candidate image are in another category different from the object category. The composition model may be a Naïve Bayes model. The at least one image feature cue may include hue, saturation, value, focus, texture, or a combination of those. The hue, saturation, value, or a combination thereof may be modeled as at least one histogram with a predetermined number of uniformly-spaced bins. The focus may be computed as a ratio of high pass energy to low pass energy. The texture may be modeled as a histogram of total response to a predetermined number of bar and spot features. The composition model may be trained using hand-labeled training images, wherein a correct layout and an incorrect layout are labeled for each training image. Probability models for both good and bad layouts may be trained for each image cue. The probability models may represent, for both good and bad layouts, the distribution over contrast values computed using Chi-Squared distance between object and background histograms, the distribution over object histograms, the distribution over background histograms, or a combination thereof. The features for possible divisions may be computed using summed area tables. Clustering may include using a k-medoids clustering method based upon geometric blur features computed within the object regions to find similar-looking object regions from the plurality of highest-ranked images, and selecting the representative image from each cluster comprises selecting the medoid of the cluster. The plurality of highest-ranked images may include a predetermined number of the highest-ranked images. The plurality of highest-ranked images may include images having a maximal composition score greater than a predetermined value.

In general, in a second aspect, the invention features a computer system for finding iconic images for a given object category. The system includes a memory for storing computer-executable instructions and a processor for executing the instructions. The instructions are for receiving candidate images, using a learned probabilistic composition model to divide each candidate image into a most probable rectangular object region and a background region, wherein the most probable rectangular object region has a maximal composition score from possible composition scores computed according to the composition model for possible divisions of the candidate image into object and background regions, each possible composition score is based upon at least one image feature cue computed over the object and background regions, and the composition model is trained on a set of images independent of the candidate images, ranking the candidate images according to the maximal composition score of each image, removing non-discriminative images from the candidate images, clustering highest-ranked images from the candidate images to form clusters, wherein each cluster includes images having similar object regions according to a feature match score, selecting a representative image from each cluster as an iconic image of the object category, and causing display of the iconic image.

In general, in a third aspect, the invention features a computer readable medium comprising computer-executable instructions for finding iconic images for a given object category. The instructions are for receiving candidate images, using a learned probabilistic composition model to divide each candidate image into a most probable rectangular object region and a background region, wherein the most probable rectangular object region has a maximal composition score from possible composition scores computed according to the composition model for possible divisions of the candidate image into object and background regions, each possible composition score is based upon at least one image feature cue computed over the object and background regions, and the composition model is trained on a set of images independent of the candidate images, ranking the candidate images according to the maximal composition score of each image, removing non-discriminative images from the candidate images, clustering highest-ranked images from the candidate images to form clusters, wherein each cluster includes images having similar object regions according to a feature match score, selecting a representative image from each cluster as an iconic image of the object category, and causing display of the iconic image.

BRIEF DESCRIPTION OF THE DRAWINGS

The present application can be best understood by reference to the following description taken in conjunction with the accompanying drawing figures, in which like parts may be referred to by like numerals.

DETAILED DESCRIPTION

The following description is presented to enable a person of ordinary skill in the art to make and use the invention, and is provided in the context of particular applications and their requirements. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the present invention is not intended to be limited to the embodiments shown, but is to be accorded the widest scope consistent with the principles and features disclosed herein.

While the invention has been described in terms of particular embodiments and illustrative figures, those of ordinary skill in the art will recognize that the invention is not limited to the embodiments or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic and/or an appropriate combination thereof, as would be recognized by one skilled in the art to carry out the recited functions.) Software and firmware can be stored on computer-readable media. Some other processes can be implemented using analog circuitry, as is well known to one of ordinary skill in the art. Additionally, memory or other storage, as well as communication components, may be employed in embodiments of the invention.

Figure 1:
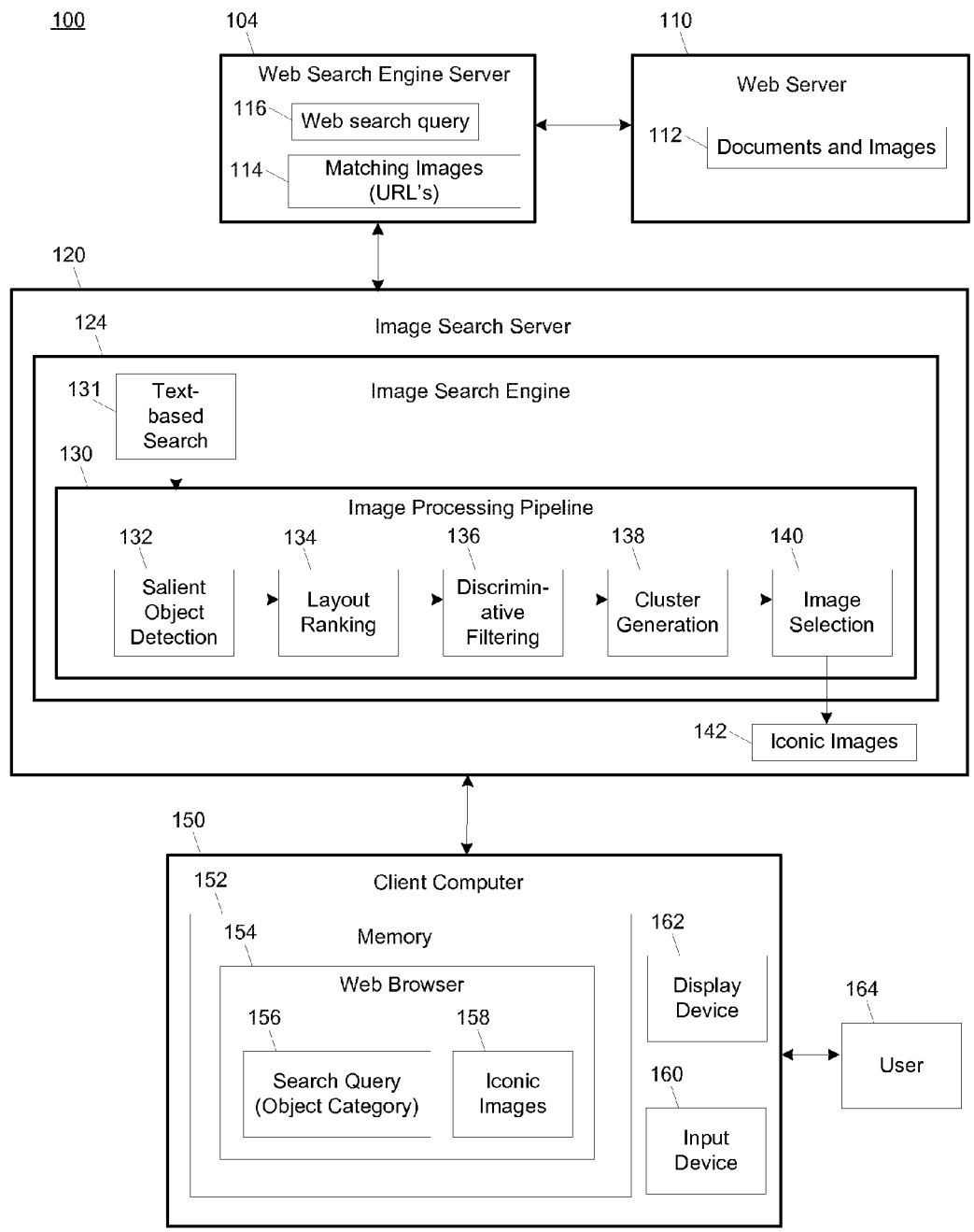
FIG. 1 illustrates a system for finding iconic images in accordance with embodiments of the invention.

FIG. 1 illustrates a system 100 for finding iconic images in accordance with embodiments of the invention. The system 100 includes, without limitation, one or more computer systems that communicate via a computer network such as the Internet. The system 100 includes a client computer 150 that interacts with a user 164 by receiving an image search query 156 in a web browser 154 or other application user interface from the user 164 via an input device 160. The web browser 154 is, for example, computer-executable program code that resides in a memory 152 of the client computer 150 and executes on a processor of the client computer 150. The client computer 150 sends the image search query 156 to an image search server 120, e.g., a computer system that hosts an image search engine 124, which searches for images 122 matching the image search query 156. The image search engine 124 is, for example, computer-executable program code stored in a memory of the image search server 120, and is executed by a processor of the image search server 120. In one example, the image search query 156 is a text string, such as the name of an object category or an individual object instance. The image search engine 124 uses a web search server 104 to search a plurality of web servers 100 for images of object categories, e.g., "tiger", where each example looks slightly different from the next, or for images of single-instance categories, e.g., "Sydney Opera House," where the results are different viewpoints of the instance, e.g., different views of the Sydney Opera House. For brevity, the term "object category" is used herein to refer to a specific object as well as to an object category. A specific object is, for example, a particular object, such as a particular horse. An object category is, for example, a category of objects, such as horses. An object category is often represented by a particular object that is considered representative of objects in that category.

In one aspect, the images 122 selected from the matching images 114 produced by the web search engine 104 are "iconic" images, i.e., images that depict a relatively large and prominent representative image of the object or object category, with relatively few additional details not related to the object or object category. An iconic image of the category "bird" may be, for example, a graphical image file that contains a computer-readable encoding of an image, e.g., a photograph, drawing, or painting of a bird, which shows an easily-recognizable view of the bird, e.g., a view of a bird in flight or perched on a branch.

In more detail, an iconic image is, in one example, a view of a relatively large object on a relatively clean or uncluttered background, where there is substantial contrast between the depicted object and the background, and the object is clearly separated from the background. A relatively large region of a candidate image is, for example, a region that occupies more than a threshold percentage of the image's area, e.g., more than 25%, or more than 40%, or the like. Such a depicted object is referred to herein as a "salient object" because the object appears prominently in the image. The salient object is ordinarily positioned at or near the center of the iconic image. The salient object is often a view of a single object that represents an object category in such a way that a person viewing the iconic image readily recognizes the object category. In one example, if there are common or canonical views of an object category, then the salient object in an iconic image should resemble one of those common or canonical views. For example, an iconic image of a horse may be a side view of a standing horse in which the horse is centered on an uncluttered background, or a view of a galloping horse shown prominently in the image. Iconic images are useful for illustrative purposes, for teaching children, for use as icons in computer-based applications, and the like. Identification of iconic images may be used to solve problems related to multimedia and imaging, such as automatically selecting the images to display for search results, summarizing image collections, and creating interfaces for browsing large collections of media content.

The computer system 100 also includes a web server 110 for hosting documents and images 112, and a web search server 104, e.g., Yahoo® Search or the like, for performing textual searches of the documents and images 112. The web search server 104 identifies a set of matching images 114 from the documents and images 112, where the matching images 114 match a web search query 116. In one example, the web search server 104 identifies images from the documents and images 112 by performing a text search of the metadata, e.g., tags, associated with the documents and images 112, and returning the Uniform Resource Locators (URL's) of images that match the text search, i.e., images that are labeled or associated with matching metadata, as the matching images 114.

In accordance with embodiments of the invention, as introduced above, an image search engine 124 evaluates the graphical features in a set of images 114 retrieved from, for example, Internet web sites 110, to identify iconic images 142 that are representative of a given object or object category. The image search engine 124 may be applied to the results of a text-based search engine 104 to identify the best-matching images, where the text-based search finds, for example, images 114 that are associated with a text label or tag that matches a search query. The set of matching images 114 resulting from the text-based search may be very large data sets, e.g., millions of images, which the image search engine 124 disclosed herein processes efficiently using a technique to select salient objects that operates in linear time in the number of images 114 and is independent of the particular object or category that is the subject of the search query 116.

In one aspect, the image search engine 124 receives a search query 156 that names an object or category of objects, and then uses computer vision and machine learning techniques to identify and select the set of iconic images 142 from the input set 114, where the iconic images 142 depict the object or category in one or more views selected from the input set 114. Each of the iconic images 142 is representative of a cluster of similar images and includes a depiction of an object that is relatively large in comparison to the size of the image, is positioned at least roughly near the center of the iconic image, and contrasts with the image background. These iconic images 142 are likely to be representative of the object or object category named in the search string.

In accordance with embodiments of the invention, the image search engine 124 operates in phases. An initial text search phase 131 invokes a text-based search engine 104 to find candidate images 114 that are labeled with or otherwise associated with the object category name specified in the web search query 116. The matching images generated by the search engine 104 are passed to an image processing pipeline 130. In the pipeline 130, a salient object detection phase selects potentially iconic images based on the layout, i.e., composition, of the images and identifies salient objects in the selected images. A layout ranking phase 134 ranks the potentially iconic images by degree of saliency to identify the best visual examples of salient images clearly delineated from their backgrounds. A discriminative filtering phase 136 filters out images that were selected but are more similar to images that were not selected in the previous phases than to other images that were selected. The remaining selected images are considered to be the best visual examples. A clustering phase 138 partitions the remaining selected images into clusters of similar images, and an image selection phase 140 selects the most representative image from each cluster. The selected representative images are iconic images 142 for the given object category 156, and may be presented to a user 164 via a display device 162 in an application such as the web browser 154 as, for example, images that are representative of the object category, or as results of an image search.

Figure 2:
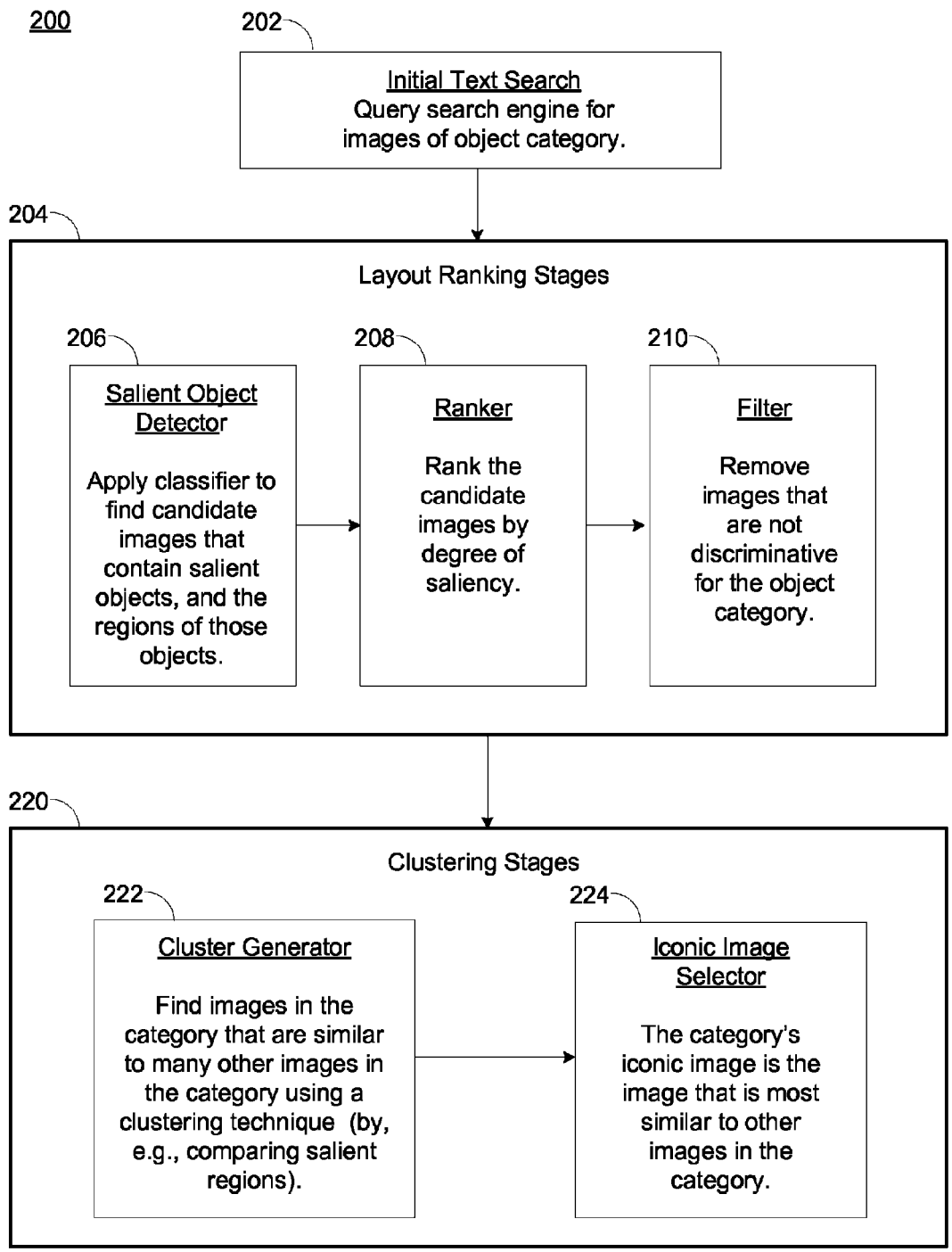
FIG. 2 illustrates an image processing pipeline for finding iconic images in accordance with embodiments of the invention.

FIG. 2 illustrates an image processing pipeline 200 for finding iconic images in accordance with embodiments of the invention. In one example, an initial text search phase 202 generates an initial set of images by querying a text-based search engine for images that are associated with a given object category name. The object category name may name a category of images, e.g., horses, or a particular object instance in the category, e.g., Palomino. As introduced above with reference to FIG. 1, the initial search 202 uses text matching to find images by searching web sites for images associated with the object category name by, for example, a metadata label that includes the object category name. The initial search 202 may also search for text (e.g., HTML) documents that contain the object category name and refer to or embed images, since these images are likely to be related to the documents. The metadata labels may be "noisy," i.e., incorrect for some images; most or all noisy images are discarded in subsequent phases. In one example, the text documents may contain references to images, e.g., hyperlinks that refer to image files. If some portion of such a hyperlink or the image file name matches the category name, or some portion of the metadata matches the category name, then the corresponding images may be returned as results of the initial search. The initial search 202 narrows the number of images to be searched, e.g., from millions of images to thousands, by limiting the query results to a predetermined number of images, e.g., up to 100,000 images tagged with the object category name.

In one example, the results of the initial text search 202 are passed to layout ranking stages 204, which apply computer vision techniques to analyze the layout, i.e., composition, of each image in the set generated by the initial search 202, and select images that are likely to contain good depictions of the desired object or category. The layout ranking stages 204 include a salient object detection phase 206 that narrows the search down to the range of approximately one thousand images per category using a nonparametric filter based on image features to filter out images that do not clearly show an object distinct from the background. The salient object detection phase 206 identifies images that contain large examples of an object, and further identifies roughly where that object is located in the image. The division between object and background is determined, independently of the object category, using a learned probabilistic model to predict the probability of a layout given a set of image features. The probabilistic model is trained on a general set of images and does not use category-specific information. In one example, the model is a Naïve Bayes model that computes 5 types of image cues, including hue, saturation, value, focus, and texture over the object and background regions for each possible layout, i.e., each possible division of an image into object and background regions, where the layout corresponds to a rectangle that encloses the object region for that layout. The rectangle specifies the object location and extent. The cues are used to compute the probability of each possible layout and assign a composition score to each rectangle, where the composition score corresponds to the probability of the layout given the image's features. The rectangle having the maximal, e.g., highest or nearly highest, composition score among possible rectangles for the image is selected as the most probable layout, and the maximal composition score (i.e., the maximal probability) is associated with the image and defines the image's salient region. The hue, saturation, and value cues are modeled as histograms with 11 uniformly spaced bins. The focus cue is computed as the ratio of high pass energy to low pass energy. The texture cue is modeled as a histogram of total response to a set of 5 oriented bar and spot filters.

The term "maximal" is used herein to represent a maximum, i.e., highest, composition score, or a score that is within a predetermined number of ranks (e.g., the top 3 scores) or a predetermined percentage (e.g., 5% or 10%) of the highest score. For example, if the top 5 composition scores, corresponding to the 5 most likely layouts, are 30, 29, 20, 10, and 3, then 30 may be considered a maximal score because it is the absolute maximum, and 29 may also be considered a maximal score if the predetermined percentage is 3% or more, or if the predetermined number of ranks is 2 or more. In another example, only the maximum score, e.g., 30, is considered a maximal score.

In one example, the features for substantially all possible layouts are computed efficiently using summed area tables. The probability $P(L|F)$ of any given layout L with features F is computed as:

$$P(L|F) = \frac{P(L)\prod_i P(F_i|L)}{P(F_1, F_2, \ldots, F_n)}$$
$$= \frac{P(L)\prod_i P(F_i|L)}{P(L)\prod_i P(F_i|L) + P(\bar{L})\prod_i P(F_i|\bar{L})},$$

where $P(L)$, the prior probability that a layout L is correct, is assumed equal to $P(\bar{L})$, the prior probability that a layout L is incorrect, $P(F_i)$ is the prior probability that a feature $F_i$ occurs in any layout, and $P(F_i|L)$ is the prior probability of feature $F_i$ occurring in layout L.

The Naïve Bayes composition model is trained with, for example, a set of 500 hand-labeled images selected as examples of good compositional layout from a set of random images uploaded to the Flickr® photo-sharing web site in a particular month. In one example, this training data is sufficient for training the image search engine. This training data is not specific to any object category, and no new training data is used once the model has been trained. Hand-labeling is done by a human, who labels the correct layout (e.g., object category name and location) as well as one random incorrect layout for each hand-labeled image. For some number, e.g., 100, of the hand-labeled images, a sky region is also selected as an extra incorrect object region, because dividing an image into sky and non-sky regions often results in high contrast, thereby incorrectly indicating a very good layout.

In one example, 6 probability models are trained for each type of image cue. These models represent, for both good and bad layouts, the distribution over contrast values computed using Chi-Squared distance, the distribution over object histograms, and the distribution over background histograms. For the Chi-Squared models, the histograms include the observed Chi-Squared distances (between the object and background histograms) over the training images, and the distribution of values are learned for both correct and incorrect layouts. This technique gives 5×2 features for the Chi-Squared model: $P(H_c|L)$, $P(H_c|\bar{L})$, ..., $P(T_c|L)$, $P(T_c|\bar{L})$.

For the object and background models, the distribution over histogram values is learned independently for each bin, and a final probability is computed as the product of the probabilities over the bins. The result is 5×2 features for the object model: $P(H_o|L), P(H_o|\bar{L}), \ldots, P(T_o|L), P(T_o|\bar{L})$, and 5×2 features for the background model: $P(H_b|L), P(H_b|\bar{L}), \ldots, P(T_b|L), P(T_b|\bar{L})$.

A feature is also trained to model the distribution of size and locations of object regions within an image. Size and location are binned into a simple 4-dimensional histogram and normalized by the total sum of the histogram. The probability of any given size and location of a layout, $P(SizeLoc|L)$, can then be computed by a lookup in this table. Because any incorrect layout is equally likely, $P(SizeLoc|\bar{L})$ is set to 1 divided by the total number of possible layouts.

In one aspect, geometric blur features are shape-based features that have been shown to perform well on object recognition tasks. The geometric blur descriptor first produces sparse channels from the grey-scale image, in this case half-wave rectified oriented edge filter responses at three orientations yielding six channels. Each channel is blurred by a spatially-varying Gaussian with a standard deviation proportional to the distance to the feature center. The descriptors are then sub-sampled and normalized. A more detailed description of geometric blur features can be found in the article "Geometric Blur for Template Matching" by A. C. Berg and J. Malik, published in the IEEE Computer Society Conference on Computer Vision and Pattern Recognition, June 2001, and incorporated herein by reference in its entirety.

A ranking phase 208 ranks the images by degree of saliency. Images with the greatest probabilities, e.g., the images having the top 1000 composition scores, are selected as the most highly salient and potentially iconic images. In one example, the layouts may be sorted by probability to produce a ranking of images. The most highly ranked images depict large salient objects, while lower ranked images tend to depict images with low contrast between foreground and background, or images with small or ill-defined objects.

A filtering phase 210 uses a similarity measurement to identify and filter out images that are not clearly specific to the specified object category, thereby reducing the number of incorrectly labeled images to a level suitable for efficient processing by a clustering technique. In one aspect, similarity between two images is measured using a spatially restricted feature match score. For each feature in image i, $f_i^k$, the feature $f_j^l$ that is the best match of i is found in image j, where, in one example, features can only match to features within a radius of 0.3 measured with respect to the object region size and location. The similarity $S(i, j)$ between images i and j is then the mean best match score over the set of features:

$$S(i, j) = \frac{1}{n}\sum_k \max_l (sim(f_i^k, f_j^l))$$

where n is the number of features in image i, and where similarity $sim(f_1, f_2)$ between two features $f_1$ and $f_2$ is computed as their normalized correlation. The N×N similarity matrix, S (where N is the number of images), is further symmetrized by taking the average of $S(i, j)$ and $S(j, i)$.

In one example, candidate images should be discriminative with respect to the specified object category. Since the salient object detection and ranking phases are independent of object category, the images selected by those phases are not necessarily specific to the object category. Such non-specific images are removed from consideration using a density estimate of how well the image compares to in-category and out-of-category images. Using the similarity measure on geometric blur features just described, each image is compared to the 1000 in-category images selected by the ranking phase 208 and also to a set of 1000 images selected at random from other object classes. In one example, for each image, if more than a threshold percentage, e.g., 50%, of a threshold number, e.g., 20, of an image's nearest neighbors are out of category, then that image is removed from consideration, i.e., filtered out. The nearest neighbors are identified using the similarity measure on geometric blur features. A predetermined number, e.g., 1000, of the highest ranking remaining images are referred to as "selected images" and are passed to the cluster generator 222.

In one example, the filtering phase 210 compares each of the selected images to every other selected image and to a random sample of a predetermined number, e.g., 1000, of the images that were not selected. The comparison determines a "similarity" for each pair of images, where the similarity corresponds to the degree of visual similarity detected between the two images. For each selected image, if the comparison indicates that more than a predetermined percentage or number, e.g., 50% or 10 of 20, of the most similar images are not selected images, then that selected image is discarded, i.e., removed from consideration.

The layout ranking stages 204 produce a small set of candidate images that include a large object well-separated from the image background. This set of 1000 images is considerably smaller than the collection produced by the initial text-based search, so more complex local-feature-based methods may now be used to compare the candidate images to find the best representatives of the object categories.

The cluster generator 222 generates clusters by, for example, selecting a subset of the collection of images, where the subset includes a predetermined number of images, then, for each "subset image" in the subset, selecting a second image from the collection, where the second image is closest to the subset image, and associating the second image with the subset image to form a cluster.

In one example, a goal is to find modes in the distribution of candidate images. Each mode is likely to correspond to a representative image for the mode's category. Modes are found using a k-medoid clustering method based on geometric blur features. The blur features are computed within the salient regions of the candidate images (or within the entire candidate images, in a baseline method) to find similar-looking objects.

In one example, the clustering phase 222 uses k-medoids clustering with, e.g., k=20, to find representative images and their corresponding clusters for each object class. Small clusters, e.g., those with fewer than 10 images, are removed, and clusters are ordered for presentation by the mean distance of images within the cluster to the medoid image. The k-medoids method starts by selecting a random set of k objects as medoids. The method continues by associating each object with its most similar medoid, selecting a non-medoid object, computing the cost of swapping the medoid with the non-medoid, and, if the non-medoid is better, then swapping the non-medoid and the medoid. These steps are repeated until there is no change in the set of medoids. The k-medoids method is initialized with a covering set based on image similarity.

An iconic image selection phase 224 selects an iconic image from each cluster, where the iconic image is the image that is most similar to other images in the category. The medoids are representative of canonical depictions of the corresponding object category and correspond to iconic images for their corresponding object categories. Therefore, in one example, the iconic image selection phase selects the medoids as the iconic images. The cluster of images that are similar to the representative images may also be presented.

Figure 3:
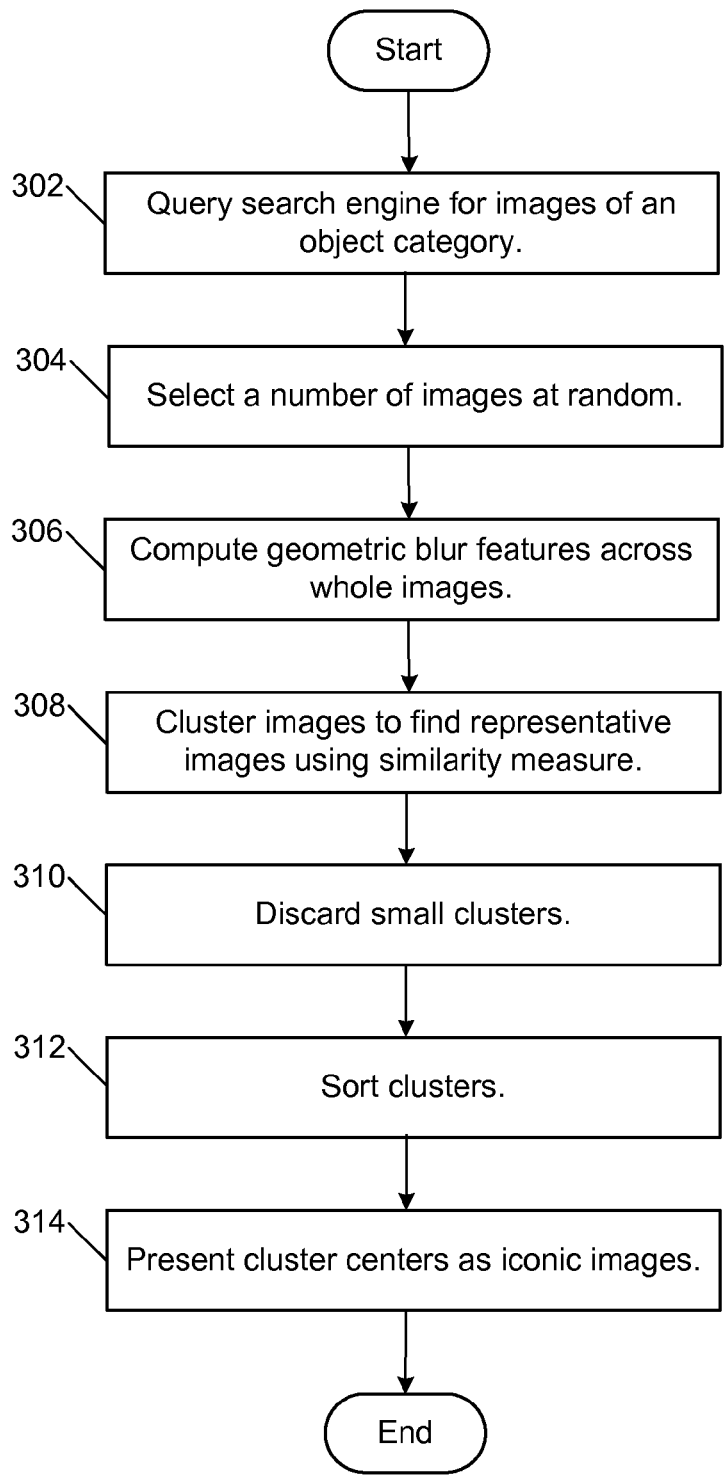
FIG. 3 illustrates a baseline process for finding iconic images using clustering in accordance with embodiments of the invention.
Figure 4:
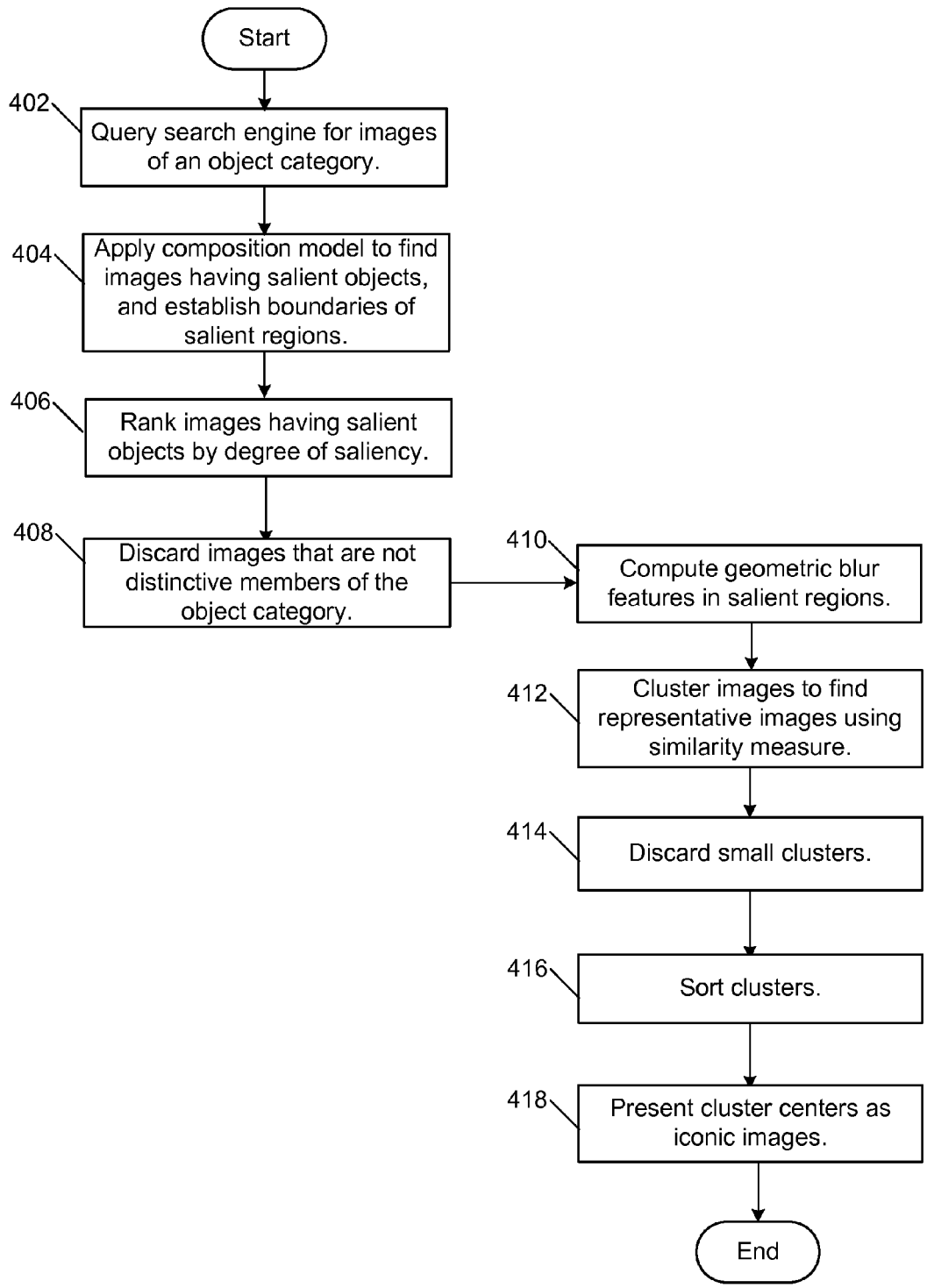
FIG. 4 illustrates a composition-based process for finding iconic images using clustering on images having relatively large and delineated object-like regions near the center of the image in accordance with embodiments of the invention.

FIG. 3 illustrates a baseline shape-clustering process for finding iconic images in accordance with embodiments of the invention. The baseline process is used herein to provide a baseline for evaluation of an image composition-based process, which is illustrated in FIG. 4. The process begins at block 302 by querying a search engine for images of an object category. Block 304 selects a number (e.g., 100,000) of images at random from the search engine results. Block 306 computes geometric blur features across whole images using the techniques described herein, with the features being computed across whole images instead of across salient regions of images. Block 308 clusters the images using the geometric blur features computed in block 306. Block 310 discards small clusters, e.g., clusters of fewer than 5 images. Block 312 sorts the images in the clusters by image saliency. Block 314 presents the cluster centers, i.e., the images with the greatest saliency in each cluster, as iconic images.

FIG. 4 illustrates a composition-based process for finding iconic images using clustering on images having relatively large and delineated object-like regions near the center of the image in accordance with embodiments of the invention. The process begins at block 402 by querying a search engine for images of a specified object category. Block 404 applies a composition model to find the maximal composition scores of the images. The composition scores correspond to degrees of saliency. Block 404 also establishes boundaries of salient regions around the salient objects in the images according to the division between object and background that corresponds to the maximal composition score. Block 406 ranks the images by their degree of saliency. Block 408 discards, i.e., filters out, images that are not distinctive, i.e., not discriminative members of the specified object category. Block 410 computes geometric blur features in the salient regions. Block 412 clusters the images using a similarity measure. Block 414 discards small clusters, e.g., those having fewer than 5 images. Block 416 sorts the images within the clusters according to image saliency, i.e., according to the composition score. Block 418 presents the cluster centers, e.g., for each cluster, the image in the cluster with greatest saliency, as iconic images for the specified object category.

Figure 5A:
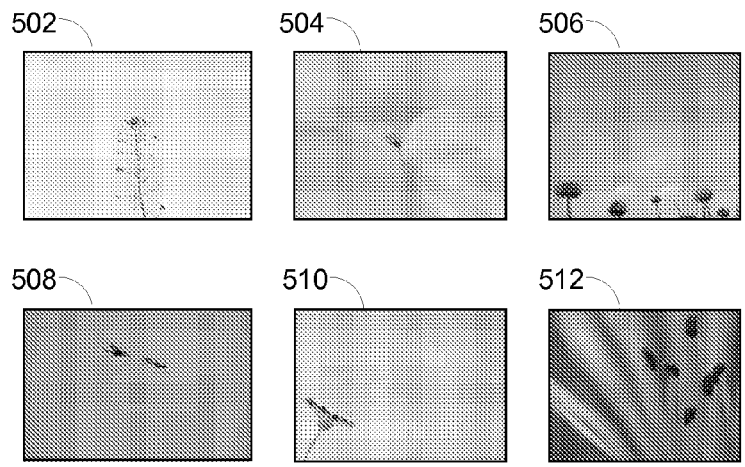
FIGS. 5A and 5B illustrate images ranked by the probability that they contain a relatively large salient object on a relatively clean background in accordance with embodiments of the invention.
Figure 5B:
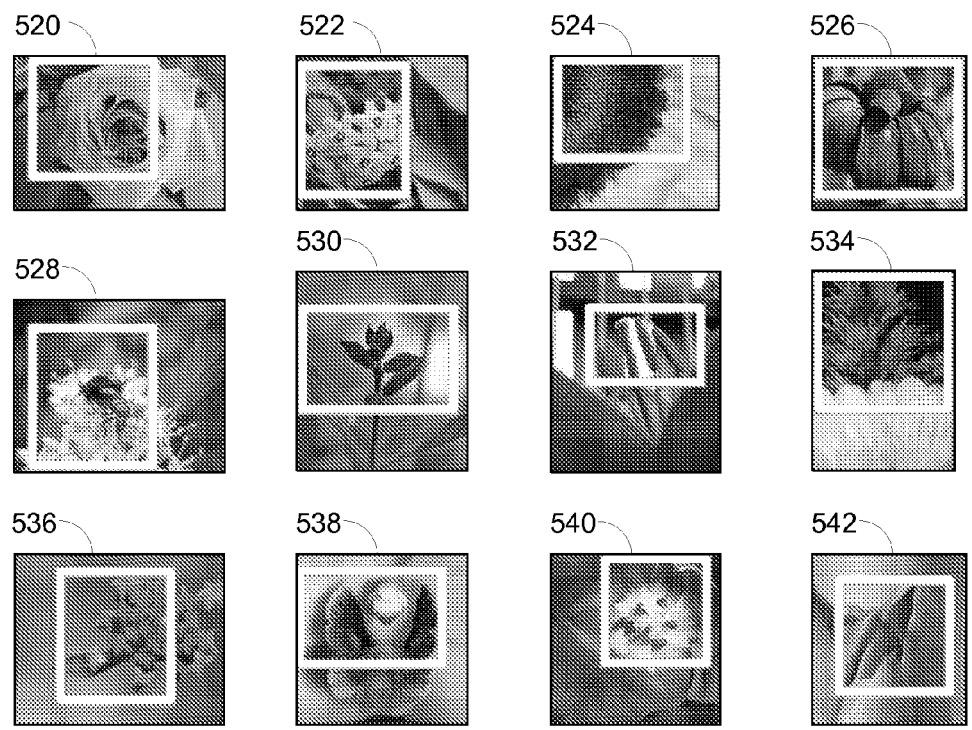

FIG. 5A illustrates least-highly ranked images of flowers and FIG. 5B illustrates most-highly ranked images of flowers in accordance with embodiments of the invention. Highly ranked images tend to contain salient objects, while less highly ranked images contain small or less prominent objects. The images of FIG. 5A are not highly ranked because the objects depicted by the images are not salient, i.e., are not relatively large objects that contrast with clean backgrounds. The small sizes of the objects and lack of contrast result in low composition scores for the images. The images of FIG. 5A are unlikely to be passed to the clustering phase because of their low composition scores. A low composition score results in a low ranking and exclusion from consideration by the clustering phase, at least if there are other images that have higher composition scores.

Image 502 depicts a flower that is relatively small compared to the size of the image, does not contrast substantially with the background, and is not entirely centered, since a portion of the flower stem appears adjacent to the edge of the image. Each of those properties contributes to the low composition score for image 502. Image 504 depicts a flower with petals that cover nearly the entire image. The only well-defined contrast boundary in the image is around a small dark dot near the center of the flower. Although the dot is near the center, well-defined, and contrasts with the surrounding flower petals, its small size results in a low composition score for image 504. Image 506 depicts a sky with several relatively small flowers at the bottom edge of the image. The lack of any object in the center of the image and the small sizes of the flowers result in a low composition score for image 506, even though the flowers contrast with the background.

Image 508 depicts two small objects, which appear to be birds, but no flowers. This image was likely labeled incorrectly, and was erroneously included in the initial search results by the text-based search engine. The small size of the objects results in a low composition score for image 504. Image 510 depicts a side view of a flower at the lower left corner of the image. The flower object has a small surface area, and is not located near the center of the image, so the flower does not qualify as a salient image. There are no other objects in image 504, so the image's composition score is low. Image 512 depicts several flower petals distributed across the entire image. These petals do not define a salient object, because they cover nearly the entire image. The image also includes several small dark objects that contrast with the background, but these objects are small and dispersed, so they do not form a salient image. The composition score of image 512 is therefore low.

FIG. 5B illustrates most-highly ranked images of flowers in accordance with embodiments of the invention. The images of FIG. 5B depict salient objects that have high composition scores and are therefore considered good candidates for the clustering phase. A bounding box based on the composition model is drawn around the salient object region of each image in FIG. 5B. These boxes are indicators of where the salient object is located in the image. Note that the rectangular borders are shown for illustrative purposes, and are not part of the images. Distinct objects with a relatively uniform solid surface area, e.g., a bug or a shell, are relatively easy to identify as salient. A reasonable detection of salient parts is also produced for objects in other categories with somewhat more spread out or less defined object boundaries, e.g., a chair with legs, in which case the salient region will ordinarily include at least the most substantial portion of the object, e.g., the seat and/or back portion of the chair, depending on the perspective of the view.

Image 520 depicts a top-view of a flower. The center of the flower contrasts with the flower petals and is located near the center of the image. The center of the flower is therefore a salient object. In image 520, a portion of the flower petals located to the left of the center appears in a darker color, possibly because of a lighting effect. That portion is included along with the center of the flower in an identified salient region, which is shown enclosed by a rectangular border. Image 520 has a high composition score because of the salient flower features located near the center of the image. Image 522 depicts a plant, which is shown in the left half of the image. The plant has a light color, which contrasts with the surrounding dark leaves. The plant is therefore a salient object, as shown by the rectangle enclosing the salient region that has been identified around the plant. Image 522 has a high composition score because the plant is a relatively large object that contrasts with the background and is at least partially located near the center of the image. Image 524 depicts a portion of a flower, including a dark flower center portion and a light petal portion. A portion of the dark center portion is located at the center of the image, so the dark center portion forms a salient region, as shown by the rectangle. Image 524 has a high composition score because a relatively large object that contrasts with the background is at least partially located near the center of the image. Image 526 depicts a flower that is centered in the image. Although the flower covers most of the image, there is sufficient contrasting background around the perimeter of the flower, so the flower is considered a salient object that covers most of the image 526.

Image 528 depicts a bright object on a dark background. The object is substantially near the center of the image 528 and there is high contrast between the object and the background. The flower is therefore a salient object, and the boundaries of the salient object with boundaries indicated by the rectangle in the image 528. Image 530 depicts a dark flower located at the center of the image. A stem of the flower extends downward to the lower edge of the image. There is medium to high contrast between the flower and the background, and the leaved portion of the flower is substantial in size. The leaved portion of the flower is therefore identified as a salient object, as shown by the rectangle. The stem of the flower has a much smaller surface area than the leaved portion, and the stem is therefore not part of the salient object. Image 532 depicts a flower that has light and dark features. These features are near the center of the image 532, and the light features contrast with the darker background. A salient region includes those features. The boundaries of the salient region are shown by the rectangle, and are defined by changes in contrast from light colors to darker colors.

Image 534 depicts a dark plant located in the upper half of the image, with a light region in the lower half of the image. The plant occupies most of the upper half of the image, and extends to the top and side edges, with some contrast between the plant and the dark background near the edges. The plant is chosen as the salient region because it occupies the center of the image, is larger than the light region, and has a perimeter that contrasts with the background. The light region has only one contrasting edge, located where the light region meets the plant. The other edges of the light region are at the borders of the image. Although there is a slightly darker feature of the light region near the bottom of the image, the contrast between the light region and the slightly darker feature is small. The light region is therefore not a likely candidate for a salient object.

Image 536 depicts a plant that contrasts with the background. Although the image 536 is shown in grayscale, the actual image is in color, and the plant is orange and purple, while the background is green and orange. This contrast between colors is sufficient to define a salient region around a portion of the plan, as shown by the rectangle. Image 538 depicts a central white feature of a flower surrounded on 3 sides by darker leaf features. The leaf features contrast with the central white feature, but are not the true background, and have been included in the salient region shown by the rectangle. The left side of the salient region extends past the dark leaf feature to include a shadow, which also contrasts with the surrounding white background. The lower leaf feature, below the salient region, is lighter in color than the leaf features to the left and right of the central white feature. The lower leaf feature is not included in the salient region, because the lower feature does not sharply contrast with the background. The relatively light color of the lower leaf feature blends into the light color of the background, so there is no sharp contrast line around the bottom edge of the lower leaf feature and hence no salient object border around that edge. Image 540 depicts a top view of a flower. A central white feature and a brightly-lit portion of the petals contrast with the darker regions of the petals and form the salient region. Image 542 depicts a side view of a flower. Darker portions of the flower, which are red in the actual image, contrast with the white portions of the flower and the light green background. A salient region is formed around the darker portions of the flower that are located near the center of the image.

The composition-based process for finding iconic images is evaluated in comparison to a method in which images are selected in accordance with the baseline clustering method of FIG. 3. To evaluate the baseline method, 1000 random images are selected from the set returned by the image search engine for each category, and geometric blur features are computed across the whole image. Then k-medoids clustering is used to find the representative images with the same similarity measure used in the composition based-method, as described elsewhere herein.

In comparison to the composition-based method, the baseline shape clustering method chooses images at random instead of choosing images with highly salient objects, computes image features on the whole image, instead of computing the features across postulated object regions, and does not remove non-discriminative images from consideration. Iconic images are taken to be the medoid images from all computed clusters. Example iconic images identified by the baseline method are shown in FIG. 5B for a flower category, FIG. 6 for a horse category, and FIG. 7B for a bird category. These images show a variety of iconic representations for each category. For example the representative horse images display horses in a variety of poses and actions, e.g., walking and jumping from various angles. For comparison, the iconic images from the baseline clustering method are presented in FIGS. 5A and 7A. The images found by the baseline method are much less representative of the object categories and tend to include more irrelevant or "junk" images, e.g., an image of a bear for the bird category, and, in another example, images of grass for the horse category (not shown). Although such images tend to be commonly occurring within the collection, the composition-based method avoids selecting these images by first processing the images to select only those images containing a large salient object. The composition-based method also benefits from computing a rough location of the object within each image, whereas the baseline method uses features computed across the whole image, and tends to be confused by matching backgrounds or whole images rather than the objects they contain.

For categories where the tag is inherently ambiguous, the composition-based method selects representative images showing common representative meanings. For example in a tiger category, the method selects iconic images for various tiger poses as well as images of house cats named "Tiger." For the beetle category, the method selects iconic images depicting insects and separate iconic images for Volkswagen cars.

For monument categories where there is a single object but images are often taken from canonical viewpoints, the method automatically selects the viewpoints from which many people have taken photographs. For example, for the Sydney Opera House category, the representative images show the Opera House from various vantage points across the water or from up close. This phenomenon is also seen for other monument categories like the Statue of Liberty, Taj Mahal, Stonehenge, Eiffel Tower, and Golden Gate Bridge. The method finds representative images even for quite challenging categories such as sheep. Sheep have neither a distinctive texture (unlike, e.g., tigers) nor a very repeatable appearance (unlike, e.g., swans) and may vary in appearance greatly in different photographs (e.g., some sheep have horns, some have black faces, and others have white faces). Despite this variation, the method selects representative images of sheep.

Figure 6:
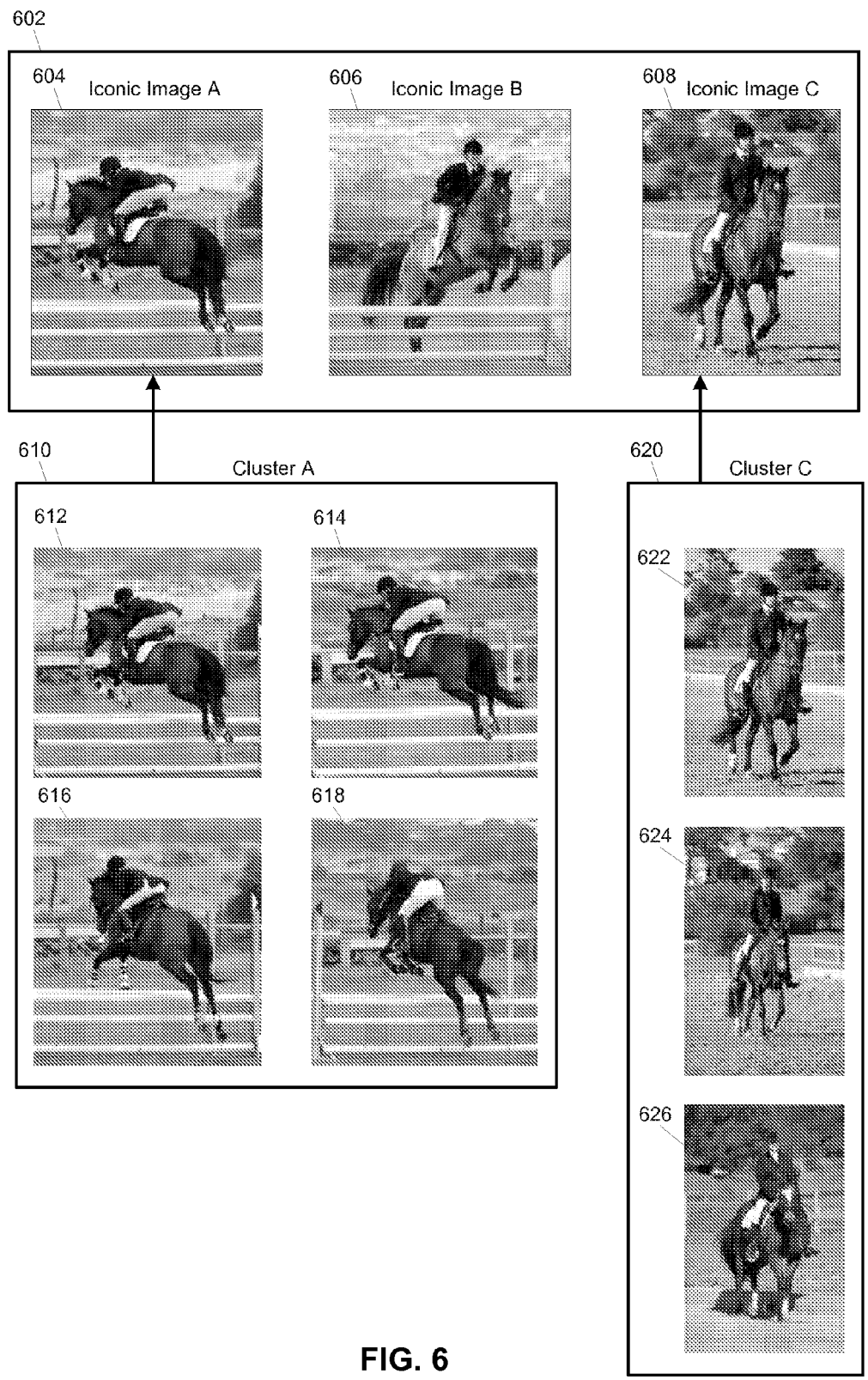
FIG. 6 illustrates iconic images and corresponding image clusters in accordance with embodiments of the invention.

Each representative image 604, 606, 608 in FIG. 6 is the medoid of a cluster. The clusters 610 and 620 illustrate coherent object appearances. For the monument categories, where the appearance is fixed, the clusters can look quite clean and could be used for virtual tourism applications or browsing sets of consumer photographs for a specific location. Other potential applications of the methods disclosed herein include computing interestingness scores and ranking search results in image search engines.

As a quantitative evaluation, users were asked to evaluate the relevance of iconic images. This evaluation was accomplished using Amazon.com's Mechanical Turk, which provides access to a large body of users. For each of 29 object categories, a human intelligence task was created using a web page for displaying all images output by the composition-based method, the baseline clustering method, and 10 images selected from the category at random. These images are randomly ordered on the page and a question is posed to each user. For example, for the category "horse," the question may be "Click on all images that show good examples of the horse category. The horse should be large (covering at least ¼ of the picture), easily identified, and near the center of the picture." For many of the evaluated object categories, e.g., horse, sheep, tiger, bird, swan, flower, butterfly, beetle, bug, and lighthouse, the composition-based method performs quite favorably compared to both the randomly selected images and the baseline clustering method. These results show that the composition-based method for finding salient objects and their proposed regions is quite useful for selecting representative images. The composition-based method performs particularly well when the category tends to have many large, self-contained, and prominent examples.

FIG. 6 illustrates iconic images and corresponding image clusters in accordance with embodiments of the invention. Three example images in an iconic image set 602 illustrate different views of horses. A jumping horse iconic image 604 depicts a horse jumping toward the left of the image. The image 604 is representative of the cluster 610 of similar images. A second jumping horse iconic image 606 depicts a horse jumping to the right, and is representative of a cluster of similar images (not shown). A trotting horse iconic image 608 depicts a horse trotting, and is representative of a cluster 620 of similar images.

Figure 7A:
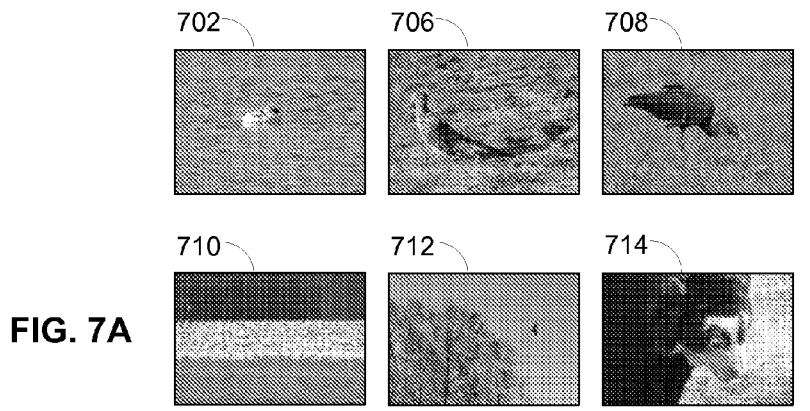
FIGS. 7A and 7B illustrate iconic images selected by the baseline clustering process and by the composition-based process in accordance with embodiments of the invention.
Figure 7A:
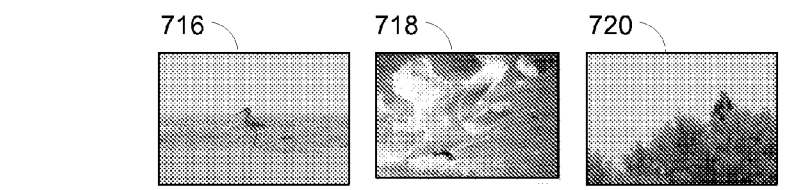

FIG. 7A illustrates a cluster of images selected by a baseline process for a bird object category in accordance with embodiments of the invention. The images in FIG. 7A are the output of the baseline method of FIG. 3, which does not select images or object regions to cluster using ranking by layout, and does not filter to remove images that are not specific to a category. Compare this output to that of FIG. 7B, which illustrates the output of a process that includes those steps. The baseline method selects some images that do not show the object category at all, e.g., image 714, which incorrectly depicts a bear in results for the bird category.

Figure 7B:
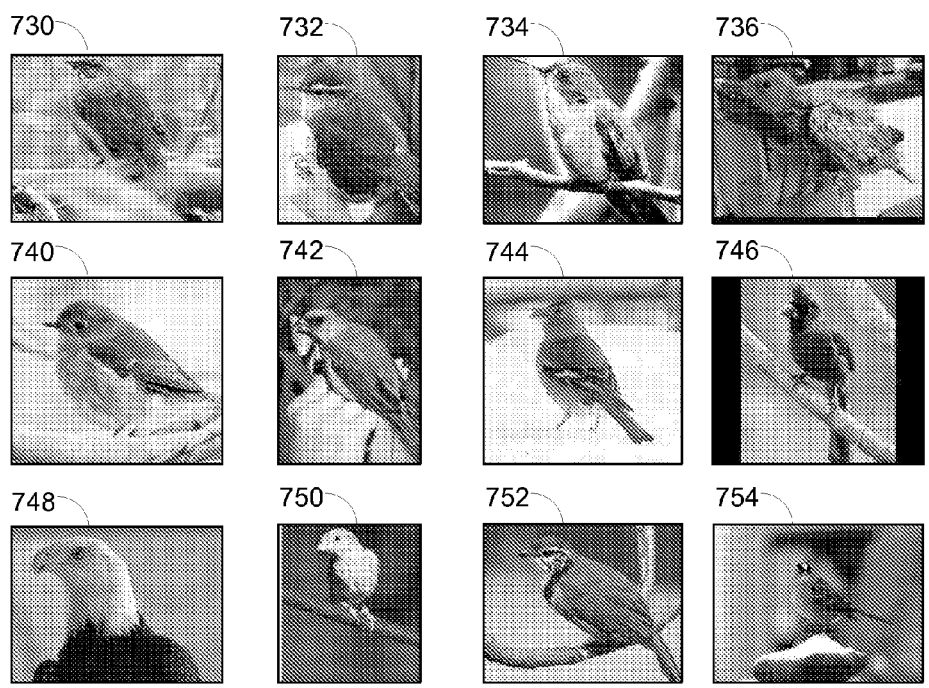

FIG. 7B illustrates a cluster of images selected by a composition-based process for a bird object category in accordance with embodiments of the invention. The images of FIG. 7B are all iconic images of birds. The birds appear in the images as salient objects that are relatively large relative to the size of the overall image, are substantially centered in the image, and are clearly visible against the backgrounds because of contrast between the salient bird objects and the backgrounds.

Figure 8:
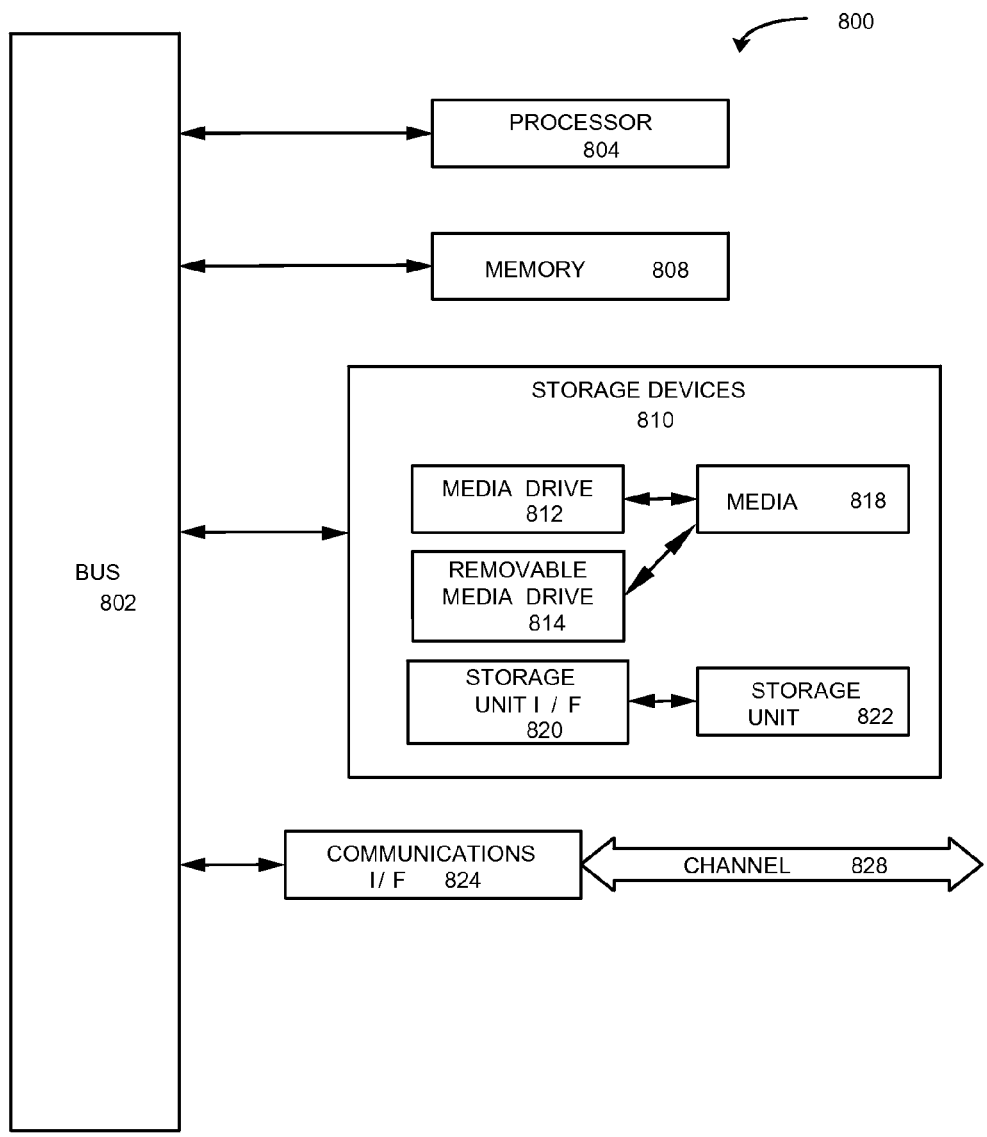
FIG. 8 illustrates a typical computing system that may be employed to implement processing functionality in embodiments of the invention.

FIG. 8 illustrates a typical computing system 800 that may be employed to implement processing functionality in embodiments of the invention. Computing systems of this type may be used in clients and servers, for example. Those skilled in the relevant art will also recognize how to implement the invention using other computer systems or architectures. Computing system 800 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 800 can include one or more processors, such as a processor 804. Processor 804 can be implemented using a general or special purpose processing engine such as, for example, a microprocessor, microcontroller or other control logic. In this example, processor 804 is connected to a bus 802 or other communication medium.

Computing system 800 can also include a main memory 808, such as random access memory (RAM) or other dynamic memory, for storing information and instructions to be executed by processor 804. Main memory 808 also may be used for storing temporary variables or other intermediate information during execution of instructions to be executed by processor 804. Computing system 800 may likewise include a read only memory ("ROM") or other static storage device coupled to bus 802 for storing static information and instructions for processor 804.

The computing system 800 may also include information storage system 810, which may include, for example, a media drive 812 and a removable storage interface 820. The media drive 812 may include a drive or other mechanism to support fixed or removable storage media, such as a hard disk drive, a floppy disk drive, a magnetic tape drive, an optical disk drive, a CD or DVD drive (R or RW), or other removable or fixed media drive. Storage media 818, may include, for example, a hard disk, floppy disk, magnetic tape, optical disk, CD or DVD, or other fixed or removable medium that is read by and written to by media drive 814. As these examples illustrate, the storage media 818 may include a computer-readable storage medium having stored therein particular computer software or data.

In alternative embodiments, information storage system 810 may include other similar components for allowing computer programs or other instructions or data to be loaded into computing system 800. Such components may include, for example, a removable storage unit 822 and an interface 820, such as a program cartridge and cartridge interface, a removable memory (for example, a flash memory or other removable memory module) and memory slot, and other removable storage units 822 and interfaces 820 that allow software and data to be transferred from the removable storage unit 818 to computing system 800.

Computing system 800 can also include a communications interface 824. Communications interface 824 can be used to allow software and data to be transferred between computing system 800 and external devices. Examples of communications interface 824 can include a modem, a network interface (such as an Ethernet or other NIC card), a communications port (such as for example, a USB port), a PCMCIA slot and card, etc. Software and data transferred via communications interface 824 are in the form of signals which can be electronic, electromagnetic, optical or other signals capable of being received by communications interface 824. These signals are provided to communications interface 824 via a channel 828. This channel 828 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms "computer program product," "computer-readable medium" and the like may be used generally to refer to media such as, for example, memory 808, storage device 818, or storage unit 822. These and other forms of computer-readable media may be involved in storing one or more instructions for use by processor 804, to cause the processor to perform specified operations. Such instructions, generally referred to as "computer program code" (which may be grouped in the form of computer programs or other groupings), when executed, enable the computing system 800 to perform features or functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 800 using, for example, removable storage drive 814, drive 812 or communications interface 824. The control logic (in this example, software instructions or computer program code), when executed by the processor 804, causes the processor 804 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

Moreover, it will be appreciated that various modifications and alterations may be made by those skilled in the art without departing from the spirit and scope of the invention. The invention is not to be limited by the foregoing illustrative details, but is to be defined according to the claims.

Although only certain exemplary embodiments have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. A method comprising:
receiving, at a computing device, a plurality of candidate images;
using, via the computing device, a learned probabilistic composition model to divide each candidate image in the plurality of candidate images into a most probable rectangular object region and a background region, wherein the most probable rectangular object region has a maximal composition score from possible composition scores computed according to the composition model for possible divisions of the candidate image into object and background regions, each possible composition score is based upon at least one image feature cue computed over the object and background regions, and the composition model is trained on a set of images independent of the plurality of candidate images;
ranking, via the computing device, the plurality of candidate images according to the maximal composition score of the most probable rectangular object region of each image determined using the learned probabilistic composition model;
removing, via the computing device, non-discriminative images from the plurality of candidate images;
clustering, via the computing device, a plurality of highest-ranked images from the plurality of candidate images ranked according to the maximal composition score of the most probable rectangular object region of each image determined using the learned probabilistic composition model to form a plurality of clusters, wherein each cluster includes a plurality of images selected from the plurality of highest-ranked images and having similar object regions according to a feature match score;
selecting, via the computing device, a representative image from each cluster as an iconic image representative of an object category; and
causing, via the computing device, display of the iconic image.

2. The method of claim 1, wherein removing non-discriminative images from the plurality of candidate images comprises: comparing each candidate image in the plurality of candidate images to a plurality of highest-ranked images from the plurality of candidate images using a similarity measure based upon the feature match score, wherein the feature match score is spatially restricted to the object regions; and
removing each candidate image for which more than a predetermined percentage of images most similar to the candidate image are in another category different from the object category.

3. The method of claim 1, wherein the composition model is a Naive Bayes model.

4. The method of claim 1, wherein the at least one image feature cue comprises hue, saturation, value, focus, texture, or a combination thereof.

5. The method of claim 4, wherein the hue, saturation, value, or a combination thereof is modeled as at least one histogram with a predetermined number of uniformly-spaced bins.

6. The method of claim 4, wherein the focus is computed as a ratio of high pass energy to low pass energy.

7. The method of claim 4, wherein the texture is modeled as a histogram of total response to a predetermined number of bar and spot features.

8. The method of claim 1, wherein the composition model is trained using a plurality of hand-labeled training images, wherein a correct layout and an incorrect layout are labeled for each training image.

9. The method of claim 1, wherein probability models for both good and bad layouts are trained for each image cue.

10. The method of claim 9, wherein the probability models represent, for both good and bad layouts, the distribution over contrast values computed using Chi-Squared distance between object and background histograms, the distribution over object histograms, the distribution over background histograms, or a combination thereof.

11. The method of claim 1, wherein the features for possible divisions are computed using summed area tables.

12. The method of claim 1, wherein clustering comprises using a k-medoids clustering method based upon geometric blur features computed within the object regions to find similar-looking object regions from the plurality of highest-ranked images, and selecting the representative image from each cluster comprises selecting the medoid of the cluster.

13. The method of claim 1, wherein the plurality of highest-ranked images comprises a predetermined number of the highest-ranked images.

14. The method of claim 1, wherein the plurality of highest-ranked images comprises images having a maximal composition score greater than a predetermined value.

15. A computer system comprising:
a memory for storing computer-executable instructions; and
a processor for executing the instructions, the instructions for:
receiving a plurality of candidate images;
using a learned probabilistic composition model to divide each candidate image in the plurality of candidate images into a most probable rectangular object region and a background region, wherein the most probable rectangular object region has a maximal composition score from possible composition scores computed according to the composition model for possible divisions of the candidate image into object and background regions, each possible composition score is based upon at least one image feature cue computed over the object and background regions, and the composition model is trained on a set of images independent of the plurality of candidate images;
ranking the plurality of candidate images according to the maximal composition score of the most probable rectangular object region of each image determined using the learned probabilistic composition model;
removing non-discriminative images from the plurality of candidate images;
clustering a plurality of highest-ranked images from the plurality of candidate images ranked according to the maximal composition score of the most probable rectangular object region of each image determined using the learned probabilistic composition model to form a plurality of clusters, wherein each cluster includes a plurality of images selected from the plurality of highest-ranked images and having similar object regions according to a feature match score;
selecting a representative image from each cluster as an iconic image representative of an object category; and
causing display of the iconic image.

16. The system of claim 15, wherein the instructions for removing non-discriminative images from the plurality of candidate images comprise:

comparing each candidate image in the plurality of candidate images to a plurality of highest-ranked images from the plurality of candidate images using a similarity measure based upon the feature match score, wherein the feature match score is spatially restricted to the object regions; and
removing each candidate image for which more than a predetermined percentage of images most similar to the candidate image are in another category different from the object category.

17. The system of claim 15, wherein the composition model is a Naive Bayes model.

18. The system of claim 15, wherein the at least one image feature cue comprises hue, saturation, value, focus, texture, or a combination thereof.

19. The system of claim 18, wherein the hue, saturation, value, or a combination thereof is modeled as at least one histogram with a predetermined number of uniformly-spaced bins.

20. The system of claim 18, wherein the focus is computed as a ratio of high pass energy to low pass energy.

21. The system of claim 18, wherein the texture is modeled as a histogram of total response to a predetermined number of bar and spot features.

22. The system of claim 15, wherein the composition model is trained using a plurality of hand-labeled training images, wherein a correct layout and an incorrect layout are labeled for each training image.

23. The system of claim 15, wherein probability models for both good and bad layouts are trained for each image cue.

24. The system of claim 23, wherein the probability models represent, for both good and bad layouts, the distribution over contrast values computed using Chi-Squared distance between object and background histograms, the distribution over object histograms, the distribution over background histograms, or a combination thereof.

25. The system of claim 15, wherein the features for possible divisions are computed using summed area tables.

26. The system of claim 15, wherein the instructions for clustering comprises using a k-medoids clustering method based upon geometric blur features computed within the object regions to find similar-looking object regions from the plurality of highest-ranked images, and selecting the representative image from each cluster comprises selecting the medoid of the cluster.

27. The system of claim 15, wherein the plurality of highest-ranked images comprises a predetermined number of the highest-ranked images.

28. The system of claim 15, wherein the plurality of highest-ranked images comprises images having a maximal composition score greater than a predetermined value.

29. A computer readable storage medium comprising computer-executable instructions tangibly stored thereon, which when executed by a processor, perform a method comprising:
receiving a plurality of candidate images;
using a learned probabilistic composition model to divide each candidate image in the plurality of candidate images into a most probable rectangular object region and a background region, wherein the most probable rectangular object region has a maximal composition score from possible composition scores computed according to the composition model for possible divisions of the candidate image into object and background regions, each possible composition score is based upon at least one image feature cue computed over the object and background regions, and the composition model is trained on a set of images independent of the plurality of candidate images;

ranking the plurality of candidate images according to the maximal composition score of the most probable rectangular object region of each image determined using the learned probabilistic composition model;

removing non-discriminative images from the plurality of candidate images;

clustering a plurality of highest-ranked images from the plurality of candidate images ranked according to the maximal composition score of the most probable rectangular object region of each image determined using the learned probabilistic composition model to form a plurality of clusters, wherein each cluster includes a plurality of images selected from the plurality of highest-ranked images and having similar object regions according to a feature match score;

selecting a representative image from each cluster as an iconic image representative of the object category; and causing display of the iconic image.

30. The computer readable storage medium of claim 29, wherein removing non-discriminative images from the plurality of candidate images comprises: comparing each candidate image in the plurality of candidate images to a plurality of highest-ranked images from the plurality of candidate images using a similarity measure based upon the feature match score, wherein the feature match score is spatially restricted to the object regions; and removing each candidate image for which more than a predetermined percentage of images most similar to the candidate image are in another category different from the object category.

31. The computer readable storage medium of claim 29, wherein the composition model is a Naive Bayes model.

32. The computer readable storage medium of claim 29, wherein the at least one image feature cue comprises hue, saturation, value, focus, texture, or a combination thereof.

33. The computer readable storage medium of claim 32, wherein the hue, saturation, value, or a combination thereof is modeled as at least one histogram with a predetermined number of uniformly-spaced bins.

34. The computer readable storage medium of claim 32, wherein the focus is computed as a ratio of high pass energy to low pass energy.

35. The computer readable storage medium of claim 32, wherein the texture is modeled as a histogram of total response to a predetermined number of bar and spot features.

36. The computer readable storage medium of claim 29, wherein the composition model is trained using a plurality of hand-labeled training images, wherein a correct layout and an incorrect layout are labeled for each training image.

37. The computer readable storage medium of claim 29, wherein probability models for both good and bad layouts are trained for each image cue.

38. The computer readable storage medium of claim 37, wherein the probability models represent, for both good and bad layouts, the distribution over contrast values computed using Chi-Squared distance between object and background histograms, the distribution over object histograms, the distribution over background histograms, or a combination thereof.

39. The computer readable storage medium of claim 29, wherein the features for possible divisions are computed using summed area tables.

40. The computer readable storage medium of claim 29, wherein clustering comprises using a k-medoids clustering computer readable medium based upon geometric blur features computed within the object regions to find similar-looking object regions from the plurality of highest-ranked images, and selecting the representative image from each cluster comprises selecting the medoid of the cluster.

41. The computer readable storage medium of claim 29, wherein the plurality of highest-ranked images comprises a predetermined number of the highest-ranked images.

42. The computer readable storage medium of claim 29, wherein the plurality of highest-ranked images comprises images having a maximal composition score greater than a predetermined value.

* * * * *